United States Patent
Ryu et al.

(10) Patent No.: US 7,523,274 B2
(45) Date of Patent: Apr. 21, 2009

(54) DATA STORAGE DEVICE AND METHOD USING HETEROGENEOUS NONVOLATILE MEMORY

(75) Inventors: Dong-Ryul Ryu, Hwaseong-si (KR); Jong-Soo Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 363 days.

(21) Appl. No.: 11/319,363

(22) Filed: Dec. 29, 2005

(65) Prior Publication Data
US 2006/0248259 A1 Nov. 2, 2006

(30) Foreign Application Priority Data
Apr. 15, 2005 (KR) .................. 10-2005-0031275

(51) Int. Cl.
*G06F 13/00* (2006.01)
(52) U.S. Cl. ...................... 711/154; 711/118
(58) Field of Classification Search ............... 711/118, 711/154
See application file for complete search history.

(56) References Cited

U.S. PATENT DOCUMENTS

| | | | |
|---|---|---|---|
| 5,724,544 A | 3/1998 | Nishi | |
| 5,901,152 A * | 5/1999 | Tanaka et al. | 714/718 |
| 5,930,818 A * | 7/1999 | Suu et al. | 711/115 |
| 2003/0005219 A1* | 1/2003 | Royer et al. | 711/113 |
| 2006/0221719 A1* | 10/2006 | Maeda et al. | 365/189.05 |
| 2006/0253667 A1* | 11/2006 | Merry et al. | 711/159 |

FOREIGN PATENT DOCUMENTS

| | | |
|---|---|---|
| JP | 8-22404 | 1/1996 |
| JP | 11-031102 | 2/1999 |
| KR | 10-1999-36633 | 5/1999 |

\* cited by examiner

*Primary Examiner*—Reba I Elmore
(74) *Attorney, Agent, or Firm*—Volentine & Whitt, P.L.L.C.

(57) ABSTRACT

A data storage device includes a memory block, a data classification unit, and a memory control unit. The memory block includes a high-speed nonvolatile memory and a low-speed nonvolatile memory, wherein a data access speed of the high-speed nonvolatile memory is greater than a data access speed of the low-speed nonvolatile memory. The data classification unit classifies the externally input data into data groups including busy data and free data, where the busy data has greater access frequency than the free data. The memory control unit configured to store the externally input data classified by the data classification unit as busy data in the high-speed nonvolatile memory, and to store the externally input data classified by the data classification unit as free data in the low-speed nonvolatile memory.

15 Claims, 4 Drawing Sheets

DATA STORAGE DEVICE AND METHOD USING HETEROGENEOUS NONVOLATILE MEMORY

BACKGROUND OF THE INVENTION

1. Field of the Invention

The present invention relates generally to a data storage device capable of storing data provided from an external device and to a method of driving the data storage device and, more particularly, the present invention relates to a data storage device having heterogeneous types of nonvolatile memory and to a method of driving the data storage device.

2. Description of the Related Art

A data storage device generally accesses memory in response to an externally input data access command, and then stores data into or reads data from the accessed memory. The memory of the data storage device may be implemented using nonvolatile memory in which case stored data is maintained even in the absence of externally supplied power.

Nonvolatile memory types may be classified as either high-speed nonvolatile memory or low-speed nonvolatile memory. Generally, high-speed nonvolatile memory has a greater data access speed than low-speed nonvolatile memory. Each has certain advantages and disadvantages relative to the other. For example, NAND flash memory, which is an example of low-speed nonvolatile memory, can be advantageously implemented to have a high memory capacity and is relatively inexpensive to produce, but it also exhibits a relatively low data access speed.

Examples of high-speed nonvolatile memories are Ferroelectric Random Access Memory (FRAM) and Phase-change RAM (PRAM). Since high-speed nonvolatile memory, such as FRAM, more randomly accesses data, its data access speed is 1,000 times faster than that of NAND flash memory. However, it is relatively difficult to implement high-speed nonvolatile memory such as FRAM with a high memory capacity, and the manufacturing cost of such a memory is relatively high.

In the meantime, data may be generally classified as either "user data" or "metadata". User data is data that is generated by a user, whereas metadata is data indicative of attributes of the externally input data, for example, the storage location of data as in a File Allocation Table (FAT). User data is accessed in large data quantities during each memory operation, but the access frequency is relatively small. In contrast, metadata is typically accessed in small data quantities, but with a high access frequency.

FIG. 1 is a block diagram illustrating a conventional nonvolatile data storage device 10 which receives data DTA from and supplies data DTA to an external device 20. Referring to FIG. 1, the conventional data storage device 10 includes memory controller 11 which accesses a homogeneous nonvolatile memory 12, for example, a NAND flash memory. Controls signals CON are generated by the memory controller 11 to control access to selected portions of the nonvolatile memory 12 so as to store data DTA into or retrieve data DTA from the nonvolatile memory 12. The data DTA is temporarily stored in a buffer circuit 13, and an interface circuit 14 is operatively interposed between the buffer circuit 13 and the external device 20.

SUMMARY OF THE INVENTION

According to an aspect of the invention, a data storage device is provided which includes a memory block, a data classification unit, and a memory control unit. The memory block includes a high-speed nonvolatile memory and a low-speed nonvolatile memory, wherein a data access speed of the high-speed nonvolatile memory is greater than a data access speed of the low-speed nonvolatile memory. The data classification unit classifies the externally input data into data groups including busy data and free data, where the busy data has greater access frequency than the free data. The memory control unit configured to store the externally input data classified by the data classification unit as busy data in the high-speed nonvolatile memory, and to store the externally input data classified by the data classification unit as free data in the low-speed nonvolatile memory.

According to another aspect of the invention, a method of storing data in a data storage device is provided. The method includes receiving input data from an external device, and classifying the input data as either busy data or free data according to an access frequency of the input data, where the busy data has greater access frequency than the free data. The input data classified as free data is stored in a low-speed nonvolatile memory of the data storage device. The method further includes determining whether a high-speed nonvolatile memory of the data storage device is accessible, the high-speed nonvolatile memory having a greater data access speed then the low-speed nonvolatile memory. The input data classified as busy data is stored in the high-speed nonvolatile memory when the high-speed nonvolatile memory is accessible, and is stored in the low-speed nonvolatile memory when the high-speed nonvolatile memory is not accessible.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
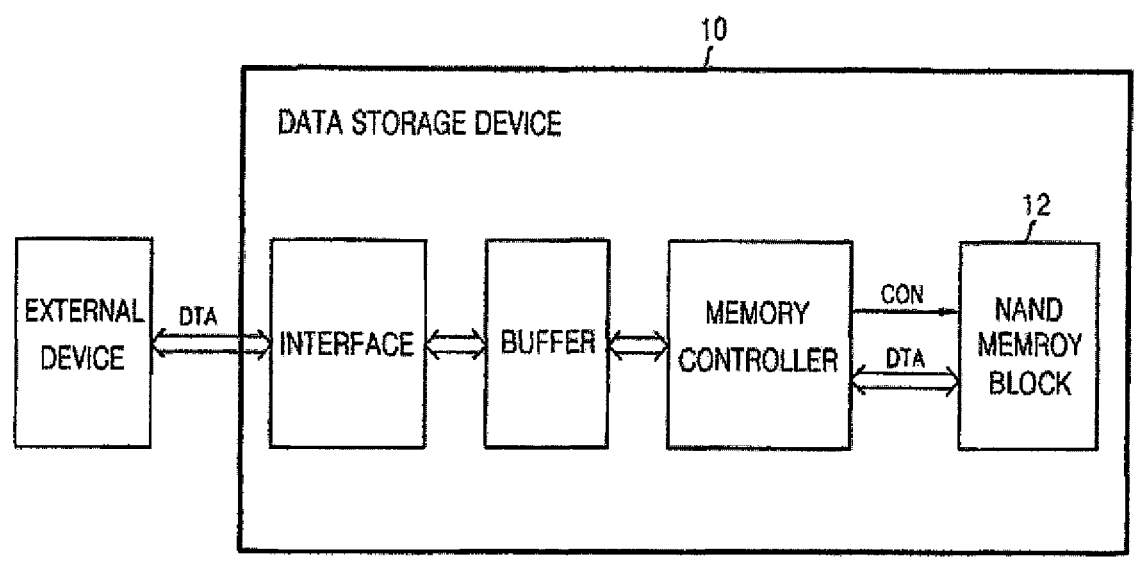
FIG. 1 is a diagram of a conventional data storage device.

Reference should now be made to the accompanying drawings, in which the same reference numerals are used throughout the different drawings to designate the same or similar components.

With reference to the accompanying drawings, the present invention will be described in detail through exemplary but non-limiting embodiments of the present invention.

Figure 2:
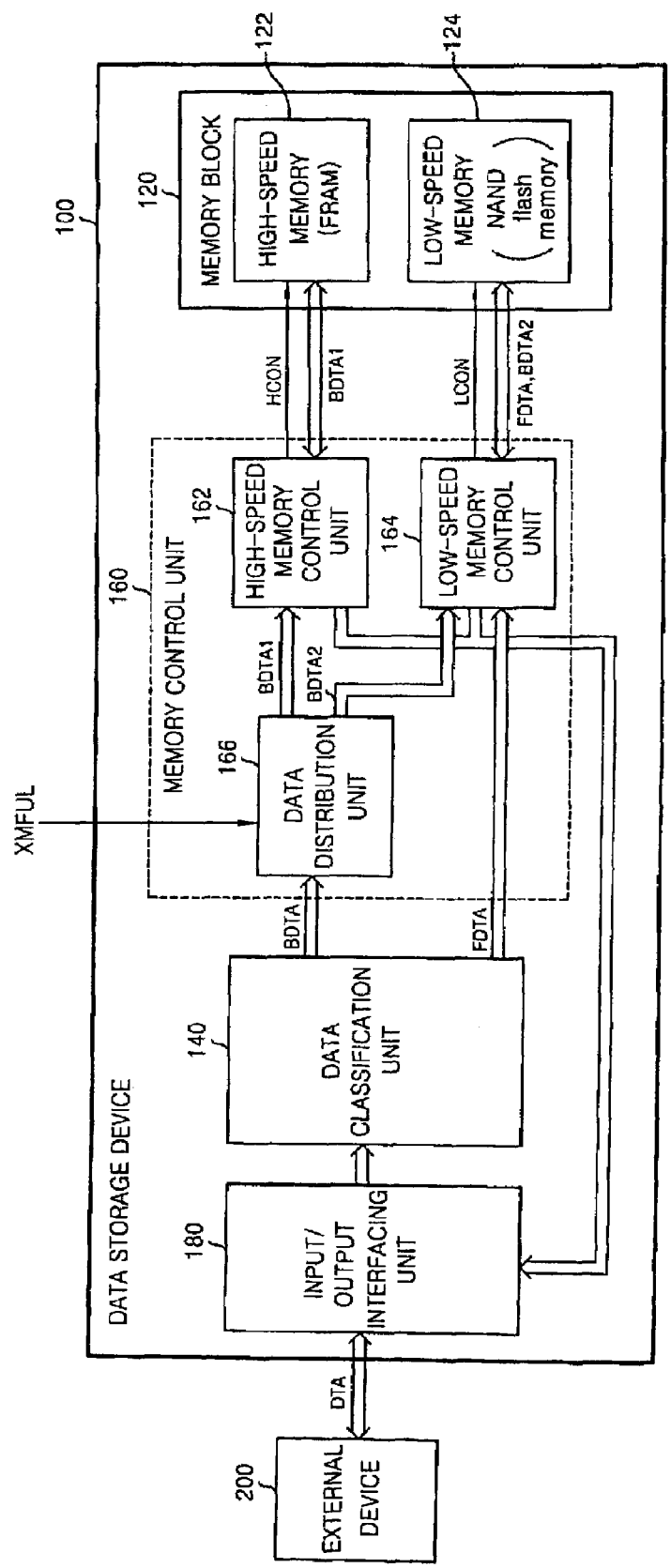
FIG. 2 is a block diagram illustrating a data storage device according to an embodiment of the present invention.

FIG. 2 is a block diagram illustrating a data storage device 100 which receives data DTA from and supplies data DTA to an external device 200 according to one embodiment of the invention. Referring to FIG. 2, the data storage device 100 includes a heterogeneous nonvolatile memory block 120, a memory control unit 160, data classification unit 140, and an input/output interfacing unit 180.

The heterogeneous nonvolatile memory block 120 includes both a high-speed nonvolatile memory 122 and a different low-speed nonvolatile memory 124. For example, the high-speed nonvolatile memory 122 may be an FRAM memory (as in FIG. 2) or a PRAM memory. The low-speed nonvolatile memory 124 may, for example, be a NAND flash memory. The data access (or data processing) speed of the high-speed nonvolatile memory 122 is greater than that of the low-speed nonvolatile memory 124.

The data classification unit 140 receives data DTA via the input/output interfacing unit 180, and classifies the data DTA according to access frequency. In the example of this embodiment, data is classified as either "busy data" BDTA or "free data" FDTA. The busy data BDTA is defined herein as data having a relatively high access frequency, such as the metadata discussed previously. The free data FDTA is defined herein as data having a relatively low access frequency, such a user data.

As shown in FIG. 2, the data classification unit 140 provides the busy data BDTA and free data FDTA to the memory control unit 160. The memory control unit 160 includes a data distribution unit 166, a high-speed memory control unit 162, and a low-speed memory control unit 164.

The data distribution unit 166 receives the busy data BDTA from the data classification unit 140, and distributes the busy data either as busy data BDTA1 to the high-speed memory control circuit 162 or as busy data BDTA2 to the low speed memory control circuit 164. In particular, when acquisition of data storage space in high-speed nonvolatile memory 122 is unsuccessful or cannot be obtained, a memory full signal XMFUL is activated and applied to the data distribution unit 166. The memory full signal XMFUL may be provided from an external processing device (not shown) that monitors the available memory capacity of the high-speed nonvolatile memory 122. As one skilled in the art will appreciate, the external processing device that generates the memory full signal XMFUL may be the operating system of a system which includes the data storage device 100.

The data distribution unit 166 is responsive to the activated memory full signal XMFUL to provide the busy data BDTA2 to the low-speed memory control unit 164. On the other hand, when the memory full signal XMFUL is not activated (meaning that the high-speed nonvolatile memory is accessible), the data distribution unit 166 supplies the busy data BDTA1 to the high-speed memory control unit 162.

When data distribution unit 166 provides the busy data BDTA1 to the high-speed memory control unit 162, the high-speed memory control unit 162 stores the busy data BDTA1 in the high-speed nonvolatile memory 122 in accordance with a high-speed memory control signal HCON. On the other hand, when the data distribution unit 166 provides the busy data BDTA2 to the low-speed memory control unit 164, the low-speed memory control unit 164 stores the busy data BDTA2 in the low-speed nonvolatile memory 124 in accordance with a low-speed memory control signal LCON.

In the meantime, the data classification unit 140 provides the free data FDTA to the low-speed memory control unit 164. The low-speed memory control unit 164 stores the free data FDTA in the low-speed nonvolatile memory 124 in accordance with the low-speed memory control signal LCON.

When retrieving data from the memory block 120, the data classification unit 140 and the data distribution unit 166 are bypassed, and the retrieved data is supplied to the input/output interfacing unit 180 from the high-speed memory control unit 162 and the low-speed memory control unit 164. The retrieved data is then output by the input/output interfacing unit 180 as data DTA to the external device 200.

The exchange of data BDTA1, BDTA2, and FDTA between memory control units 162 and 164 and nonvolatile memories 122 and 124 may be executed using dedicated memory lines, or using a single bus system capable of sharing some of the pins of the chips of nonvolatile memories 122 and 124 (so as to reduce the number of utilized pins).

Figure 3:
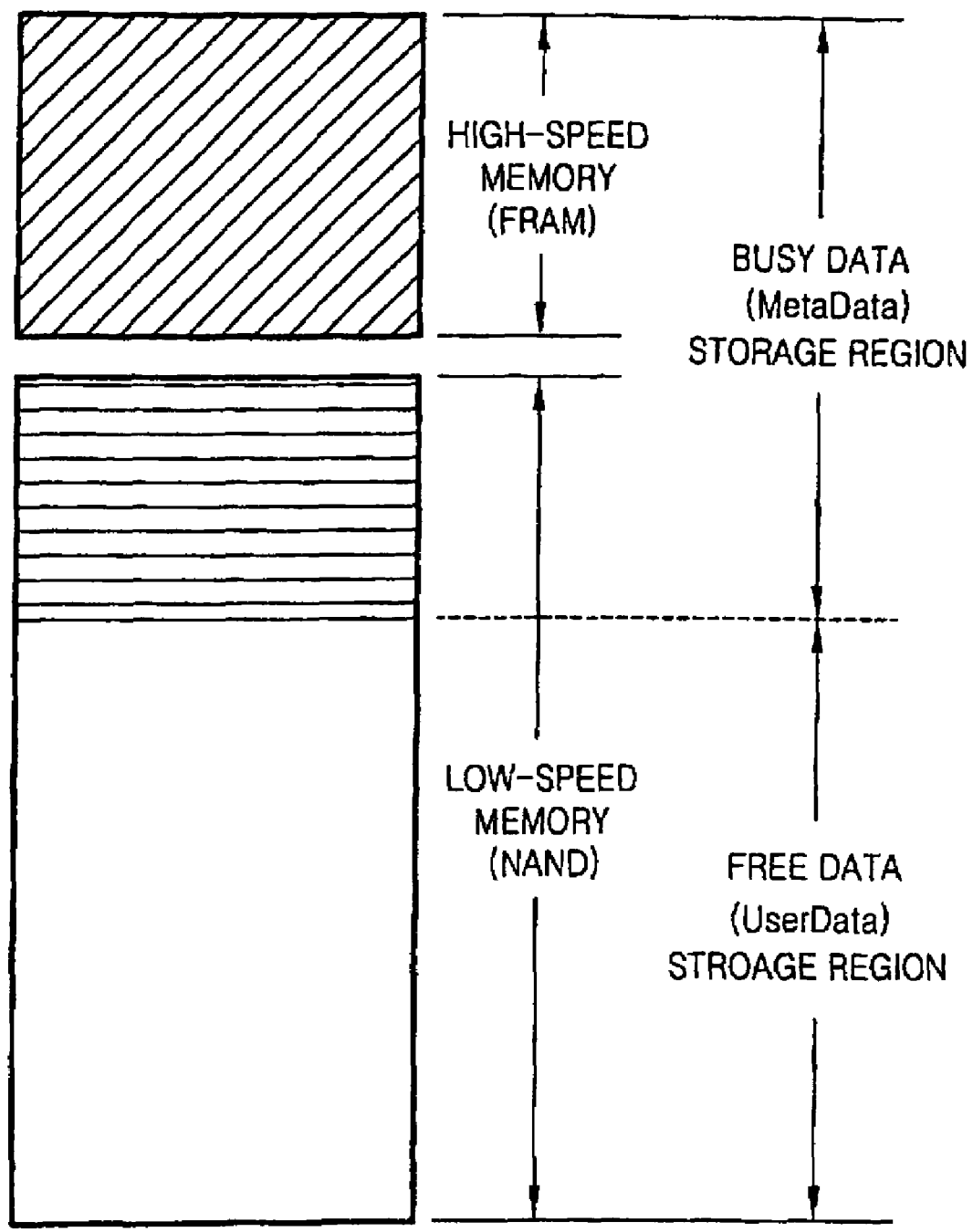
FIG. 3 is a diagram showing the configuration of the memory block of FIG. 2 according to an embodiment of the present invention.

FIG. 3 is a diagram showing the logical configuration of the memory block 120 of FIG. 2. Referring to FIG. 3, the memory block 120 includes high-speed nonvolatile memory (e.g., an FRAM) and a low-speed nonvolatile memory (e.g., NAND flash). In general, the free data (e.g., user data) storage region is contained in the low-speed nonvolatile memory, whereas the busy data (e.g., metadata) storage region is contained in the high-speed nonvolatile memory.

However, if the acquisition of data storage space in high-speed nonvolatile memory is unsuccessful (e.g., the high-speed nonvolatile memory is full), the busy data storage region is expanded into the low-speed nonvolatile memory.

Figure 4:
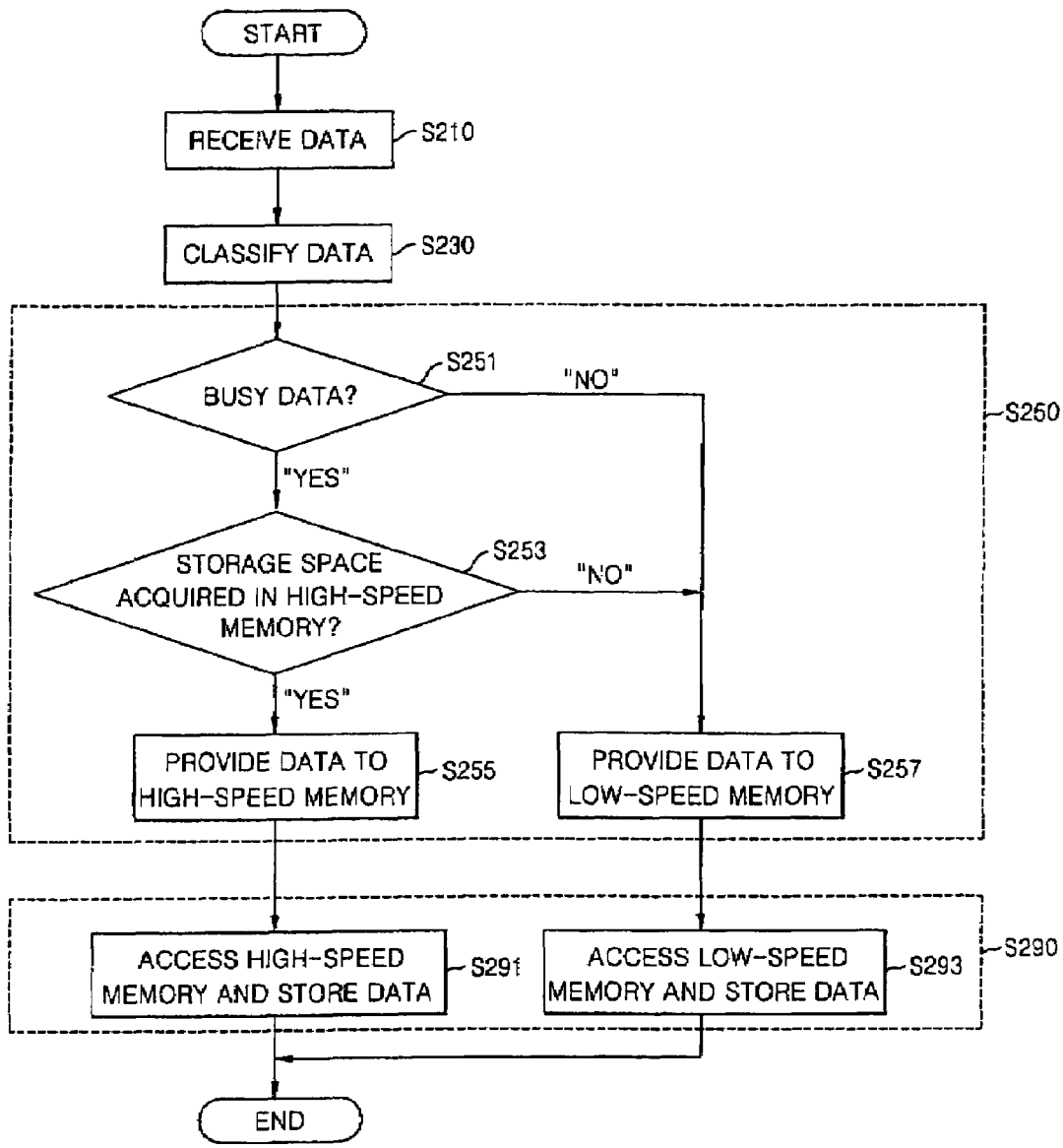
FIG. 4 is a flowchart of a method of storing data according to an embodiment of the present invention.

FIG. 4 is a flowchart showing a method of storing data in accordance with an embodiment of the present invention.

Referring to FIG. 4, at step S210, a data storage device receives input data from an external device. At step S230, the input data is classified according to access frequency as either busy data or free data.

At step S250, the input data is forwarded to a heterogeneous nonvolatile memory block. Step S250 includes sub-steps S251, S253, S255 and S257.

At sub-step S251, it is determined whether the input data has been classified at step S230 as busy data. If the input data is classified as busy data, at sub-step S253 it is further determined whether data storage space can be acquired in a high-speed nonvolatile memory of the heterogeneous nonvolatile memory block. If data storage space can be acquired in the high-speed nonvolatile memory, then at sub-step S255 the busy data is forwarded to the high-speed nonvolatile memory. On the other hand, if the input data has not been classified as busy data, or if storage space in the high-speed nonvolatile memory cannot be acquired, then at sub-step S257 the input data is forwarded to a low-speed nonvolatile memory of the heterogeneous nonvolatile memory block.

At step S290, the input data provided to the heterogeneous nonvolatile memory block is stored. In particular, at sub-step S291, the high-speed nonvolatile memory is accessed and the input data stored therein. In this case, the input data is busy data and the high-speed nonvolatile memory is not full. On the other hand, at sub-step S293, the low-speed nonvolatile memory is accessed and the input data stored therein. In this case, the input data is either free data, or busy data where the high-speed nonvolatile memory is full.

The conventional data storage device 10 discussed previously in connection with FIG. 1 suffers limitations in data processing capacity since frequently accessed "busy data", such a metadata, are stored in low-speed nonvolatile memory.

In contrast, in the data storage devices and methods according to embodiments of the present invention, the busy data BDAT is stored in the high-speed nonvolatile memory if storage space is available, where the high-speed nonvolatile memory has higher data access speed but lower memory capacity than the low-speed nonvolatile memory. In the meantime, the large quantities of infrequently accessed free data FDAT is effectively stored in the low-speed nonvolatile memory. Accordingly, the data access speed of the data storage device can be improved using limited resources.

Furthermore, in embodiments of the present invention, when the data storage space of the high-speed nonvolatile memory for busy data is insufficient, the busy data can instead be adaptively stored in the low-speed nonvolatile memory instead. Accordingly, the memory space of low-speed nonvolatile memory is sufficiently flexible to prevent the waste of memory resources.

Although exemplary embodiments of the invention have been disclosed for illustrative purposes, those of ordinary skill in the art will appreciate that various modifications, additions and substitutions are possible without departing from the scope and spirit of the invention as disclosed in the accompanying claims.

What is claimed is:

1. A data storage device, comprising:
   a memory unit comprising a high-speed nonvolatile memory and a low-speed nonvolatile memory, wherein a data access speed of the high-speed nonvolatile memory is greater than a data access speed of the low-speed nonvolatile memory;
   a data classification unit configured to classify input data into data groups including busy data and free data, wherein the busy data has greater access frequency than the free data; and
   a memory controller configured to store the input data classified by the data classification unit as busy data in the high-speed nonvolatile memory, and to store the input data classified by the data classification unit as free data in the low-speed nonvolatile memory.

2. The data storage device of claim 1, wherein the memory controller stores the input data classified by the data classification unit as busy data in the low-speed nonvolatile memory when the high-speed nonvolatile memory is not accessible to store the input data.

3. The data storage device of claim 2, wherein the memory controller comprises:
   a high-speed memory control circuit which stores the input data in the high-speed nonvolatile memory;
   a low-speed memory control circuit which stores the input data in the low-speed nonvolatile memory; and
   a data distribution unit which receives a control signal indicative of the accessibility of the high-speed nonvolatile memory, and which supplies the input data which has been classified as busy data to the high-speed memory control circuit when the control signal indicates that the high-speed nonvolatile memory is accessible, and supplies the input data which has been classified as busy data to the low-speed memory control circuit when control signal indicates that the high-speed nonvolatile memory is not accessible.

4. The data storage device of claim 1, further comprising:
   a buffer connected to the memory controller; and
   an input/output interface connected to the buffer.

5. The data storage device of claim 1, wherein the busy data includes metadata and the free data includes user data.

6. The data storage device of claim 1, wherein the low-speed nonvolatile memory includes NAND flash memory.

7. The data storage device of claim 6, wherein the high-speed nonvolatile memory includes a nonvolatile memory which is different than NAND flash memory.

8. The data storage device of claim 7, wherein the high-speed nonvolatile memory includes Ferroelectric Random Access Memory (FRAM) or Phase-change RAM (PRAM).

9. A method of storing data in a data storage device, comprising:
   receiving input data from an external device;
   classifying the input data as either busy data or free data according to an access frequency of the input data, wherein the busy data has greater access frequency than the free data;
   storing the input data classified as free data in a low-speed nonvolatile memory of the data storage device;
   determining whether a high-speed nonvolatile memory of the data storage device is accessible, the high-speed nonvolatile memory having a greater data access speed then the low-speed nonvolatile memory;
   storing the input data classified as busy data in the high-speed nonvolatile memory when the high-speed nonvolatile memory is accessible; and
   storing the input data classified as busy data in the low-speed nonvolatile memory when the high-speed nonvolatile memory is not accessible.

10. The method of storing data of claim 9, wherein the busy data includes metadata and the free data includes user data.

11. The method of storing data of claim 9, wherein the low-speed nonvolatile memory includes NAND flash memory.

12. The method of storing data of claim 11, wherein the high-speed nonvolatile memory includes a nonvolatile memory which is different than NAND flash memory.

13. The method of storing data of claim 12, wherein the high-speed nonvolatile memory includes Ferroelectric Random Access Memory (FRAM) or Phase-change RAM (PRAM).

14. A storage device, comprising:
   a low-speed nonvolatile memory having a first data access speed;
   a high-speed nonvolatile memory having a second data access speed, the second data access speed being greater than the first data access speed;
   a data classifier configured to classify input data as busy data or free data based on access frequency, the busy data having a greater access frequency than the free data; and
   a controller configured to store the free data in the low-speed nonvolatile memory and to store the busy data in one of the high-speed nonvolatile memory and the low-speed nonvolatile memory, depending on accessibility of the high-speed nonvolatile memory.

15. The storage device of claim 14, wherein the controller stores the busy data in the high-speed nonvolatile memory when the high-speed nonvolatile memory is accessible and in the low-speed nonvolatile memory when the high-speed nonvolatile memory is not accessible.

* * * * *